(12) United States Patent
Iyengar

(10) Patent No.: US 11,163,481 B2
(45) Date of Patent: *Nov. 2, 2021

(54) MONITORING STORAGE SYSTEMS FOR PERFORMANCE

(71) Applicant: International Business Machines Corporation, Armonk, NY (US)

(72) Inventor: Arun K. Iyengar, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/412,514

(22) Filed: May 15, 2019

(65) Prior Publication Data

US 2019/0265906 A1 Aug. 29, 2019

Related U.S. Application Data

(63) Continuation of application No. 16/002,570, filed on Jun. 7, 2018, now Pat. No. 10,423,356, which is a continuation of application No. 15/091,198, filed on Apr. 5, 2016, now Pat. No. 10,082,983.

(51) Int. Cl.
*G06F 3/06* (2006.01)
*G06F 11/34* (2006.01)
*G06F 11/30* (2006.01)

(52) U.S. Cl.
CPC ......... *G06F 3/0653* (2013.01); *G06F 3/0611* (2013.01); *G06F 3/0683* (2013.01); *G06F 11/3006* (2013.01); *G06F 11/3034* (2013.01); *G06F 11/34* (2013.01); *G06F 11/3409* (2013.01); *G06F 11/3452* (2013.01); *G06F 2201/81* (2013.01)

(58) Field of Classification Search
CPC ..... G06F 3/0653; G06F 3/0683; G06F 3/0611
USPC ......................................... 711/154
See application file for complete search history.

(56) References Cited

U.S. PATENT DOCUMENTS

| | | | |
|---|---|---|---|
| 8,918,566 B2 | 12/2014 | Padala et al. | |
| 2002/0004788 A1 | 1/2002 | Gros et al. | |
| 2002/0091722 A1 | 7/2002 | Gupta et al. | |
| 2003/0184584 A1* | 10/2003 | Vachuska | G06F 9/451 715/762 |
| 2004/0136029 A1 | 7/2004 | Zhang et al. | |
| 2007/0208920 A1 | 9/2007 | Tevis | |
| 2007/0263541 A1 | 11/2007 | Cobb et al. | |

(Continued)

OTHER PUBLICATIONS

Y. Won et al., "Intelligent Storage: Cross-Layer Optimization for Soft Real-Time Workload," ACM Transactions on Storage, Aug. 2006, pp. 255-282, vol. 2, No. 3.

(Continued)

*Primary Examiner* — Tasnima Matin
(74) *Attorney, Agent, or Firm* — Daniel Morris; Ryan, Mason & Lewis, LLP

(57) ABSTRACT

A system for monitoring a plurality of storage systems includes an interface specifying a set of methods for using at least one storage system, an implementation of the interface for each of the plurality of storage systems, wherein at least one of the implementations of the interface is configured to process a plurality of requests, and a performance monitor configured to monitor performance of requests for at least one of a plurality of classes of requests.

20 Claims, 21 Drawing Sheets

(56) References Cited

U.S. PATENT DOCUMENTS

| | | |
|---|---|---|
| 2009/0070779 A1 | 3/2009 | Wang et al. |
| 2011/0307889 A1* | 12/2011 | Moriki ................ G06F 11/3495 |
| | | 718/1 |
| 2012/0047346 A1 | 2/2012 | Kawaguchi |
| 2012/0317355 A1 | 12/2012 | Ishizaki et al. |
| 2013/0024481 A1* | 1/2013 | Bolesta ................ G06F 3/0629 |
| | | 707/812 |
| 2015/0149663 A1 | 5/2015 | Weihs |
| 2015/0199235 A1* | 7/2015 | Fiske ................ G06F 11/1048 |
| | | 714/766 |
| 2015/0199253 A1 | 7/2015 | Sprague et al. |
| 2015/0304306 A1 | 10/2015 | Ponsford et al. |
| 2015/0379420 A1 | 12/2015 | Basak et al. |

OTHER PUBLICATIONS

IBM, "Framework for Obtaining Server, Storage, and Connectivity Performance Using Live Experiments," ip.com, IP No. 000185419, Jul. 24, 2009, 3 pages.

Disclosed Anonymously, "Method and System for Context Aware Storage Provisioning," ip.com, IP No. 000239932, Dec. 16, 2014, 5 pages.

E. Shriver et al., "An Analytic Behavior Model for Disk Drives with Readahead Caches and Request Reordering," Proceedings of the ACM SIGMETRICS Joint International Conference on Measurement and Modeling of Computer Systems, Jun. 22-26, 1998, pp. 182-191, vol. 26, No. 1.

List of IBM Patents or Patent Applications Treated as Related.

\* cited by examiner

```
/*
 * Key-value interface
 */
public interface KeyValue<K,V> {

/**
      * Encodes return status for storage methods
      *
      * */
    public enum ReturnStatus {
        SUCCESS,
        FAILURE
    }

/**
      * delete all entries from the storage service
      *
      * @return status code
      *
      * */
    public ReturnStatus clear();

/**
      * delete a key-value pair
      *
      * @param key
      *             key corresponding to value
      *
      * @return # of objects deleted, NUM_UNKNOWN if unknown
      *
      * */
    public int delete(K key);
```

*FIG. 3B*

```
/**
 * delete one or more key-value pairs
 *
 * @param keys
 *          iterable data structure containing the keys to delete
 *
 * @return # of objects deleted, NUM_UNKNOWN if unknown
 *
 * */
public int deleteAll(List<K> keys);

/**
 * look up a value
 *
 * @param key
 *          key corresponding to value
 * @return value corresponding to key, null if key is not present
 *
 * */
public V get(K key);

/**
 * look up one or more values.
 *
 * @param keys
 *          iterable data structure containing the keys to look up
 * @return map containing key-value pairs corresponding to data
 *
 * */
public Map<K, V> getAll(List<K> keys);
```

FIG. 3C

```
/**
 * Return a string identifying the type of storage service
 *
 * @return string identifying the type of storage service
 * */
public String storeType();

/**
 * store a key-value pair
 *
 * @param key
 *           key associated with value
 * @param value
 *           value associated with key
 *
 * @return status code
 *
 * */
public ReturnStatus put(K key, V value);

/**
 * store one or more key-value pairs
 *
 * @param map
 *           map containing key-value pairs to store
 *
 * @return # of objects stored, NUM_UNKNOWN if unknown
 *
 * */
public int putAll(Map<.K, V> map);
```

FIG. 3D

```
/**
 * Return number of stored objects
 *
 * @return number of stored objects
 * */
public long size();

/**
 * Output contents of current database to a string.
 *
 * @return string containing output
 *
 * */
public String toString();

```
public interface KeyValueMonitored<K,V> extends KeyValue<K,V> {

/**
     * Reset the StorageStats object to the initial state
     *
     * */
    public void clearStorageStats();

/**
     * get data structure returning storage stats
     *
     * @return data structure containing storage stats
     *
     * */
    public StorageStats getStorageStats();

/**
     * input new StorageStats data structure with customized values
     *
     * @param stats
     *              data structure with customized values
     *
     * */
    public void setStorageStats(StorageStats newStats);

```java
public class StorageStats implements Serializable {
    private static final long serialVersionUID = 1L;

private RequestType[] requestTypes = RequestType.values();
    private String storeType;

private AtomicLong startTime = new AtomicLong();
        // start time for the monitoring interval
        // This is used to calculate average time per request but should not
        // affect collection of statistics
    private AtomicLong numRequests = new AtomicLong();
        // total number of requests
    private AtomicLong totalRequestTime = new AtomicLong();
        // total time spent processing requests
    private AtomicLong endTime = new AtomicLong();
        // end time for the monitoring interval, might
        // not have been set yet.  This is used to calculate average time
        // per request but should not affect collection of statistics
    private RequestStats[] requestStats = new RequestStats[requestTypes.length];

/**
     * Constructor.
     *
     * @param historySize
     *           # of most recent data points to keep around for each transaction type
     * @param type
     *           string identifying the type of store
     */
    public StorageStats(int historySize, String type) {
        storeType = type;
        startTime.set(Util.getTime());
        for (int i = 0; i < requestTypes.length; i ++) {
            requestStats[i] = new RequestStats(historySize, requestTypes[i].toString());
        }
    }
```

FIG. 5B

```
    // This method records a new data point
void recordRequest(long timeInterval, RequestType requestType) {
    numRequests.incrementAndGet();
    totalRequestTime.addAndGet(timeInterval);
    requestStats[requestType.ordinal()].recordRequest(timeInterval);
}

/**
 * Return data structure containing data for a specific request type
 *
 * @param requestType
 *            the request type
 *
 * @return data structure for requestType
 *
 * */
public RequestStats getRequestData(RequestType requestType) {
    return requestStats[requestType.ordinal()];
}

/**
 * Return total number of requests
 *
 * @return total number of requests
 *
 * */
public long getNumRequests() {
    return numRequests.get();
}
```

*FIG. 5C*

```
/**
 * Return total time taken by requests
 *
 * @return total time taken by requests
 *
 * */
public long getTotalRequestTime() {
    return totalRequestTime.get();
}

/**
 * Return start time
 *
 * @return start time
 *
 * */
public long getStartTime() {
    return startTime.get();
}

/**
 * Return end time
 *
 * @return end time
 *
 * */
public long getEndTime() {
    return endTime.get();
}
```

FIG. 5D

```
/**
 * Return string indicating type of store corresponding to statistics
 *
 * @return string indicating type of store corresponding to statistics
 *
 * */
public String getStoreType() {
    return storeType;
}

/**
 * Set startTime to the current time.  startTime is used to calculate
 * the total length of the monitoring interval.  If this method is called
 * after data points have already been collected, then the calculated
 * total length of the monitoring interval and proportion of time spent
 * in store operations will not be accurate
 *
 * startTime is initialized to the time the StorageStats constructor
 * is invoked.  Therefore, setStartTimeNow() does not need to be
 * invoked unless there is a delay before the StorageStats
 * object is used.
 *
 * */
public void setStartTimeNow() {
    startTime.set(Util.getTime());
}

/**
 * Set endTime to the current time.  endTime is used to calculate
 * total length of the monitoring interval.  If data collection continues
 * after endTime, then the calculated total length of the monitoring
 * interval and proportion of time spent in store operations will
 * not be accurate.
 *
 * */
public void setEndTimeNow() {
    endTime.set(Util.getTime());
}
```

*FIG. 5E*

```
/**
 * Return string describing summary statistics
 *
 * @return string describing summary statistics
 *
 * */
public String summaryStats() {
    if (numRequests.get() == 0) {
        return "No requests for store " + storeType + "\n";
    }
    String returnVal = "Statistics for store of type " + storeType + "\n";
    returnVal += "Total requests: " + numRequests.get() + "\n";
    returnVal += "Total request time in milliseconds: " + totalRequestTime.get() + "\n";
    returnVal += "Average milliseconds per request: " +
            (((float) totalRequestTime.get())/numRequests.get()) + "\n";
    returnVal += "Start time in milliseconds: " + startTime.get() + "\n";
    long timeEnd = endTime.get();
    if (timeEnd == 0) {
        timeEnd = Util.getTime();
    }
    returnVal += "End time in milliseconds: " + timeEnd + "\n";
    long intervalLength = timeEnd - startTime.get();
    returnVal += "Length of monitoring interval in milliseconds: " + intervalLength + "\n";
    returnVal += "Proportion of time spent on store operations: " +
            (((float) totalRequestTime.get())/intervalLength) + "\n";
    return returnVal;
}
```

FIG. 5F

```java
/**
 * Return string describing statistics by request type
 *
 * @return string describing statistics by request type
 *
 * */
public String detailedStats() {
    if (numRequests.get() == 0) {
        return "No requests for store " + storeType + "\n";
    }
    String returnVal = "Statistics for all transaction types, store is: " + storeType + "\n";
    for (int i = 0; i < requestTypes.length; i ++) {
        returnVal += requestStats[i].allStats();
    }
    return returnVal;
}

/**
 * Return string describing all statistics
 *
 * @return string describing all statistics
 *
 * */
public String allStats() {
    return summaryStats() + detailedStats();
}

```
                                                                    ┌ 600-1
public class RequestStats implements Serializable {
    private static final long serialVersionUID = 1L;

private long[] requestTimes;   // maintain request times for last n requests
    private int rear = 0; // index in requestTimes indicating rear of queue private AtomicLong numRequests = new AtomicLong();   // total number of requests
    private AtomicLong totalRequestTime = new AtomicLong();
    // total time spent processing requests
    private String requestType;

RequestStats(int historySize, String type) {
        requestTimes = new long[historySize];
        requestType = type;
    }

/**
     * Return total number of requests
     *
     * @return total number of requests
     *
     * */
    public long getNumRequests() {
        return numRequests.get();
    }

/**
     * Return total time taken by requests
     *
     * @return total time taken by requests
     *
     * */
    public long getTotalRequestTime() {
        return totalRequestTime.get();
    }
```

*FIG. 6B*

```java
/**
 * Return string indicating type of request corresponding to statistics
 *
 * @return string indicating type of request corresponding to statistics
 *
 * */
public String getRequestType() {
    return requestType;
}

/**
 * Return array of most recent request overheads ordered from least to most recent
 *
 * @return array of most recent request overheads
 *
 * */
public long[] getRecentRequestTimes() {
    return requestTimes;
} void recordRequest(long timeInterval) {
    numRequests.incrementAndGet();
    totalRequestTime.addAndGet(timeInterval);
    storeTime(timeInterval);
} private synchronized void storeTime(long timeInterval) {
    requestTimes[rear] = timeInterval;
    rear = (rear + 1) % requestTimes.length;
}
```

FIG. 6C

```
/**
 * Return string describing summary statistics
 *
 * @return string describing summary statistics
 */
public String summaryStats() {
    if (numRequests.get() == 0) {
        return "No requests of type " + requestType + "\n";
    }
    String returnVal = "Statistics for requests of type " + requestType + "\n";
    returnVal += "Total requests: " + numRequests.get() + "\n";
    returnVal += "Total request time in milliseconds: " + totalRequestTime.get() + "\n";
    returnVal += "Average milliseconds per request: " + (((float) totalRequestTime.get())/numRequests.get()) + "\n";
    return returnVal;
}
```

```java
/**
 * Return string describing recent request overheads
 *
 * @return string describing recent request overheads
 *
 * */
public String recentOverheads() {
    if (numRequests.get() == 0) {
        return "No requests of type " + requestType + "\n";
    }
    int front;
    String returnVal = "Time in milliseconds for recent requests of type "
            + requestType + " ordered from earliest to latest\n";
    if (numRequests.get() <= requestTimes.length) {
        front = 0;
    }
    else {
        front = rear;
    }
    int numOverheads = 0;
    long totalOverhead = 0;
    while (true) {
        returnVal += requestTimes[front] + "\n";
        numOverheads ++;
        totalOverhead += requestTimes[front];
        front = (front + 1) % requestTimes.length;
        if (front == rear) {
            break;
        }
    }
    returnVal += "Total recent requests: " + numOverheads + "\n";
    returnVal += "Total time for recent requests in milliseconds: "
    + totalOverhead + "\n";
    returnVal += "Average milliseconds per recent request: "
    + (((float) totalOverhead)/numOverheads) + "\n";
    return returnVal;
}
```

*FIG. 6E*

```
/**
 * Return string describing all statistics
 *
 * @return string describing all statistics
 *
 * */
public String allStats() {
    return summaryStats() + recentOverheads();
}

```
public class MonitoredKeyValue<K,V> implements KeyValueMonitored<K, V> {
    private int historySize;
    private StorageStats stats;
    private KeyValue<K,V> store;

/**
     * Constructor.
     *
     * @param kvStore
     *         object corresponding to store to be monitored
     * @param historyLength
     *         # of most recent data points to keep around for each transaction type
     *
     */
    public MonitoredKeyValue(KeyValue<K,V> kvStore, int historyLength) {
        store = kvStore;
        historySize = historyLength;
        stats = new StorageStats(historySize, store.storeType());
    }

/**
     * look up a value
     *
     * @param key
     *         key corresponding to value
     * @return value corresponding to key, null if key is not present
     *
     * */
    @Override
    public V get(K key) {
        long startTime = Util.getTime();
        V returnVal = store.get(key);
        long endTime = Util.getTime();
        stats.recordRequest(endTime - startTime, RequestType.GET);
        return returnVal;
    }
}
```

800

910

MONITORING STORAGE SYSTEMS FOR PERFORMANCE

BACKGROUND

The present application relates to storage, and more specifically, to techniques for monitoring storage systems. Various application programs require access to storage systems for different workloads. There are a wide variety of storage systems available today, including cloud-based storage systems, relational databases, file systems, caches, etc. As the number and type of storage systems available increases, selecting amongst possible options of storage systems for a particular workload becomes an increasingly difficult and complex task.

SUMMARY

Embodiments of the invention provide techniques for monitoring storage systems.

For example, in one embodiment, a system for monitoring a plurality of storage systems comprises an interface specifying a set of methods for using at least one storage system, an implementation of the interface for each of the plurality of storage systems, wherein at least one of the implementations of the interface is configured to process a plurality of requests, and a performance monitor configured to monitor performance of requests for at least one of a plurality of classes of requests, wherein the system is implemented using at least one processing device comprising a processor coupled to a memory.

In another embodiment, a method comprises receiving a plurality of requests, utilizing at least one implementation of an interface to process the plurality of requests, wherein the interface specifies one or more methods for using at least one storage system of a plurality of storage systems and is implemented for each of the plurality of storage systems, and utilizing a performance monitor to monitor performance of requests for at least one of a plurality of classes of requests, wherein the method is performed by at least one processing device comprising a processor coupled to a memory.

BRIEF DESCRIPTION OF THE DRAWINGS

FIGS. 3A-3D depict example code for implementing a common interface, according to an embodiment of the present invention.

FIG. 4 depicts example code for facilitating monitoring of storage systems, according to an embodiment of the present invention.

FIGS. 5A-5F depict example code for maintaining storage statistics, according to an embodiment of the present invention.

FIGS. 6A-6E depict example code for maintaining request statistics, according to an embodiment of the present invention.

FIG. 7 depicts additional example code for facilitating monitoring of storage systems, according to an embodiment of the present invention.

DETAILED DESCRIPTION

Illustrative embodiments of the invention may be described herein in the context of illustrative methods, systems and devices for monitoring storage systems. However, it is to be understood that embodiments of the invention are not limited to the illustrative methods, systems and devices but instead are more broadly applicable to other suitable methods, systems and devices.

Figure 1:
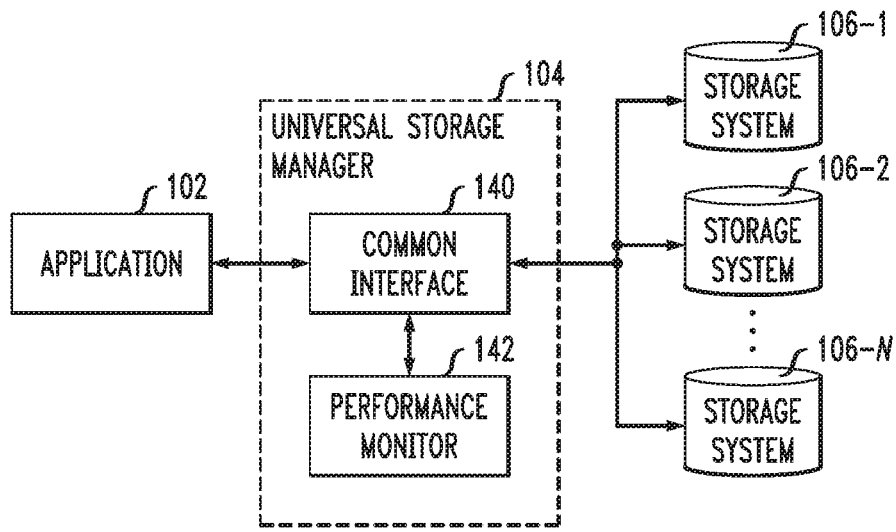
FIG. 1 depicts a system for monitoring storage systems, according to an embodiment of the present invention.

FIG. 1 shows an example of a system 100 for monitoring storage systems. The system 100 includes an application 102, universal storage manager 104 and storage systems 106-1, 106-2, . . . 106-N, collectively referred to herein as storage systems 106. Application 102 may be implemented or run on a client device that also implements or runs at least a portion of the universal storage manager 104. Such a client device may also, in certain embodiments, include one or more of the storage systems 106. Thus, the system 100 including the application 102, universal storage manager 104 and one or more of storage systems 106 may be run on the same computing or processing device, such as a computer, server, etc. The system 100, or elements thereof, may be implemented on or using separate devices. For example, the universal storage manager 104 and application 102 may be implemented using different computing or processing devices.

Although FIG. 1 shows a system 100 with only a single application 102, embodiments are not so limited. In some embodiments, multiple different applications are configured to utilize universal storage manager 104. The different applications may be run or implemented using one or more different client devices. In other embodiments, multiple instantiations of the universal storage manager 104 are used by different applications. The universal storage manager 104 may also be provided via a cloud computing platform accessible by multiple different applications, tenants or client devices. Numerous other arrangements of one or more applications, universal storage managers and storage systems are possible in other embodiments.

The universal storage manager 104 implements a common interface 140 and a performance monitor 142. The common interface 140 provides interfaces allowing application 102 to use the plurality of different storage systems 106. The performance monitor 142, which utilizes common interface 140, can monitor calls or storage requests directed to the storage systems 106.

Throughout this description, various embodiments are described with respect to the universal storage manager 104 of system 100, which includes common interface 140 and performance monitor 142. It is to be appreciated, however, that various functionality described with respect to the common interface 140 may, in some embodiments, be implemented at least in part by the performance monitor 142. Similarly, various functionality that is described with respect to the performance monitor 142 may, in some embodiments, be implemented at least in part by the common interface 140. In some embodiments, the functionality of common interface 140 and performance monitor 142 may be implemented in a single functional module rather than using distinct components. In other embodiments, the functionality of the common interface 140 and/or performance monitor 142 may be split amongst multiple distinct modules. As one example, storage requests may be assigned to classes using a dedicated request assignment module, rather than by the common interface 140 and/or performance monitor 142.

Various applications require access to storage systems in order to run different workloads. There are currently inadequate tools for evaluating storage systems and allowing an application to pick from multiple storage systems based on the needs of the application for a particular workload. Embodiments provide techniques allowing application 102 to pick and choose from multiple storage options for a particular workload, such as amongst storage systems 106, to evaluate the performance and behavior of storage systems 106 using multiple criteria, and to pick an appropriate storage option based on application needs and the evaluation of storage systems 106. Embodiments also allow for application 102 to utilize multiple different ones of the storage systems 106, and to monitor the performance of storage systems 106 and provide overall evaluations of the storage systems 106 across multiple criteria.

Figure 2:
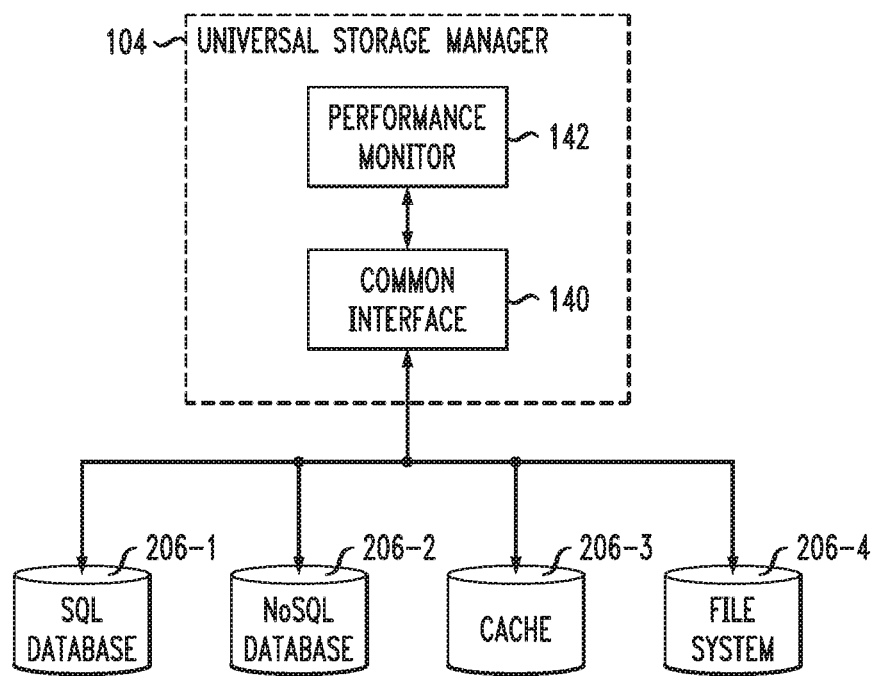
FIG. 2 depicts a universal storage manager and examples of monitored storage systems, according to an embodiment of the present invention.

There are a wide variety of storage systems 106 available. FIG. 2 shows a system 200 including universal storage manager 104 providing common interface 140 to several different types of storage systems, including structured query language (SQL) database 206-1, non SQL (NoSQL) database 206-2, cache 206-3 and file system 206-4. SQL database 206-1 may be, by way of example, relational database such as MySQL® IBM DB2®, an SQL server, etc. NoSQL database 206-2 may be, by way of example, Cloudant® Apache Cassandra™, Object Storage, Apache HBaseOt, Hazelcast®, etc. Cache 206-3 may be, by way of example, Redis®, memcached, Google® Guava, Ehcache®, etc. It is to be appreciated, however, that the specific types and number of storage systems shown in FIG. 2 are presented by way of example, and that embodiments may be used with a wide variety of different types and numbers of storage systems. The term "storage system" as used herein is thus intended to be broadly construed to include the aforementioned data stores and data services as well as other types of data stores and data services, including data stores and data services both in persistent storage and in main memory.

Universal storage manager 104 is utilized by application 102 to store data on storage systems 106 in some embodiments. Universal storage manager 104 provides common interface 140 allowing application 102 to use different types of storage systems 106. The universal storage manager 104 also provides performance monitor 142, which has the ability to monitor calls or storage requests directed to the storage systems 106. The performance monitor 142 may monitor storage requests to determine the time required for different storage operations, such as how long it takes to store and/or retrieve data from respective ones of the storage systems 106. The universal storage manager 104 may maintain this data over a period of time.

Performance monitor 142 may use a wide variety of criteria to evaluate the performance of storage systems 106. By way of example, such criteria include: (1) average response time; (2) percentage of storage requests which exceed a response time threshold; (3) percentage of time that a storage system is unavailable; and (4) the performance of different types of storage requests. The percentage of time that a storage system is unavailable may be determined by setting a response time threshold $t_r$. If a response to a particular storage request is not received after time $t_r$, a storage system may be considered unavailable. The performance may vary for different types of storage requests such as reads, writes, atomic reads and/or writes across multiple entities, writes for certain types of storage requests, etc.

The universal storage manager 104 may define several types of storage requests. In some embodiments, the universal storage manager 104 defines the following types of storage requests: clear, delete, deleteAll, get, getAll, storeType, put, putAll, size, and toString. The "clear" request deletes all entries from the storage service. The "delete" request deletes a key-value pair, and the "deleteAll" request deletes a list of key-value pairs. The "get" request looks up a value corresponding to a key, and the "getAll" request looks up values corresponding to a list of keys. The "storeType" request returns a string identifying the type of storage service. The "put" request stores a key-value pair, and the "putAll" request stores a set of key-value pairs. The "size" request returns a number of stored objects, and the "toString" request outputs the contents of a current database to a string. Further details regarding these storage request types will be discussed below with respect to FIGS. 3A-3D. It is to be appreciated that the above list of storage request types is not exhaustive, and that various other types of storage requests may be used including but not limited to transactional updates across multiple data objects, data accesses to certain keys specified by regular expressions, etc. Users or application 102 may also define their own types of storage requests.

Universal storage manager 104, using performance monitor 142, can track the performance of different storage allocators for each type of storage request. The performance monitor 142 can use the tracked performance so as to recommend an appropriate storage service such as one of storage systems 106 to application 102 for particular workloads. While various embodiments are described herein with the use of a performance monitor 142 implemented by universal storage manager 104 and used by application 102, embodiments are not so limited. In some cases, the application 102 or possibly a client device running the application 102 may monitor storage systems 106 directly. In addition, in some cases the application 102 or a client device running the application 102 may access storage systems 106 directly rather than via the common interface 140 of universal storage manager 104.

FIGS. 3A-3D show example code for implementing common interface 140. FIG. 3A shows portion 300-1 of the sample code, FIG. 3B shows portion 300-2 of the sample code, FIG. 3C shows portion 300-3 of the sample code and FIG. 3D shows portion 300-4 of the sample code. The portions 300-1, 300-2, 300-3 and 300-4 are collectively referred to herein as common interface code 300. The common interface code 300 is written in the Java programming language, but common interface 140 need not be written in Java. Instead, various other types of programming languages may be used.

The common interface code 300 is illustratively a key-value based implementation of common interface 140. Common interface 140, however, need not be key-value based. In other embodiments, common interface 140 may be implemented as an interface which uses various file system features, query language features such as SQL, etc.

Common interface code 300, as mentioned above, is key-value based and implements an interface denoted KeyValue. The common interface code 300 further defines a number of methods for storage request types, including the aforementioned clear, delete, deleteAll, get, getAll, store- Type, put, putAll, size and toString. The common interface code 300 defines parameters and return values output by common interface 140 in response to the different types of storage requests.

The clear method deletes all entries from a storage service, and returns a status defined in ReturnStatus as either SUCCESS or FAILURE.

The delete method deletes a specified key-value pair, and takes as input a parameter key which corresponds to a value in the key-value store. The delete method returns the number of objects that are deleted, or NUM_UNKNOWN if the number of objects deleted is not known. While the delete method is used to remove a single key-value pair, the deleteAll method may be used to remove one or multiple key-value pairs. The deleteAll method deletes one or more key-value pairs specified by the parameter keys, which is an iterable data structure containing the keys to delete. The iterable data structure may be, by way of example, a list. Similar to the delete method, deleteAll returns the number of objects deleted or NUM_UNKNOWN if the number of objects deleted is not known.

The get method looks up a value in the key-value store. The get method takes as input the parameter key, and returns the value corresponding to key or null if key is not present in the key-value store. While the get method is used to look up a single value in the key-value store, the getAll method may be used to look up the value of one or multiple values. The getAll method takes as input the parameter keys, which is an iterable data structure such as a list, and returns a map containing key-value pairs corresponding to data in the key-value store.

The storeType method is used to identify the type of storage service. The storeType method does not require any parameter input, and returns a string value identifying the type of storage service.

The put method is used to store a key-value pair, and takes as input the parameters key and value. The put method returns a status code ReturnStatus, which is either SUCCESS or FAILURE as previously defined. While the put method is used to store a single key-value pair, the putAll method may be used to store one or multiple key-value pairs. The putAll method takes as input the parameter map, which is a data structure such as a map containing key-value pairs to store. The putAll method returns the number of objects stored or NUM_UNKNOWN if the number of objects stored is not known.

The size method is used to look up the number of stored objects in the key-value store. The size method does not require any parameter input, and returns the number of stored objects.

The toString method outputs the contents of a current database. The toString method does not require any parameter input, and returns a string value containing the contents of the current database.

The KeyValue interface in common interface code 300 can be implemented for multiple different types of storage systems, including but not limited to a file system, and SQL database such as MySQL, multiple NoSQL databases such as Cloudant®, Object Storage which implements the OpenStack® Switch application programming interface (API), and multiple caches including in-process caches such as Guava and Redis®. Thus, application 102 can utilize the common interface 140 to access multiple distinct types of storage systems as well as multiple different storage systems of a same type.

The performance monitor 142, as discussed above, may be configured so as to monitor the performance of storage systems 106. In some embodiments, this monitoring is facilitated by the common interface 140. FIG. 4 shows example code which may be an extension of the common interface code 300 implementing common interface 140. The sample code in FIG. 4 is referred to herein as monitoring code 400, and is once again written in the Java programming language. Similar to the common interface code 300, the monitoring code 400 may be written in various other programming languages.

Monitoring code 400 is an extension of the KeyValue interface of common interface code 300. Monitoring code 400 defines an interface for managing storage statistics, including methods clearStorageStats, getStorageStats and setStorageStats. The clearStorageStats method resets the StorageStats object to its initial state. The getStorageStats method retrieves a data structure containing storage statistics, and the setStorageStats method inputs a new data structure with customized values.

The monitoring code 400, as discussed above, is an extension of the KeyValue interface defined in common interface code 300. The monitoring code 400 makes use of a class StorageStats, used to maintain storage statistics for a particular storage system. FIGS. 5A-5F show example code for implementing the StorageStats class. FIG. 5A shows portion 500-1 of the sample code, FIG. 5B shows portion 500-2 of the sample code, FIG. 5C shows portion 500-3 of the sample code, FIG. 5D shows portion 500-4 of the sample code, FIG. 5E shows portion 500-5 of the sample code and FIG. 5F shows portion 500-6 of the sample code. The portions 500-1, 500-2, 500-3, 500-4, 500-5 and 500-6 are collectively referred to herein as storage statistics code 500. The storage statistics code 500, similar to common interface code 300 and monitoring code 400, is written in the Java programming language. In other embodiments, however, code for maintaining storage statistics for particular storage systems may be written in various other programming languages.

The storage statistics code 500 utilizes and/or defines a number of variables for maintaining storage statistics for a particular storage system, including startTime, numRequests, totalRequestTime, and endTime. The variable startTime specifies the start time of a monitoring interval, and may be used to calculate average time per storage request. The startTime variable, however, does not necessarily affect the collection of statistics. For example, in some cases statistics may be collected prior to the time specified in the startTime variable. The numRequests variable specifies a total number of requests, and the variable totalRequestTime specifies a total time spent processing requests. The variable endTime specifies the end time of a monitoring interval, and need not be set in advance or at all. The endTime variable may be useful in calculating the average time per storage request, but similar to the startTime variable the endTime variable does not necessarily affect the collection of statistics. For example, statistics may be collected after the time specified by the endTime variable.

The constructor StorageStats is used to define certain parameters for monitoring the storage system. StorageStats takes as input the parameters historySize and type. The historySize parameter specifies the number of most recent data points to store for each transaction or storage request type, while the type parameter is a string value identifying the type of the storage system. recordRequest specifies a method for recording a new data point.

The RequestStats method is used to return a data structure containing data for a specific storage request type. Request- Stats takes as input the parameter requestType, which specifies a storage request type. RequestStats returns the data structure for requestType.

The getNumRequests method is used to return the total number of storage requests, the getTotalRequestTime method is used to return the total time taken by storage requests, the getStartTime method is used to return the start time, the getEndTime method is used to return the end time and the getStoreType method is used to return a string value indicating the type of storage system. getNumRequests, getTotalRequestTime, getStartTime, getEndTime and getStoreType do not require any parameter input.

The setStartTimeNow method is used to set the variable startTime to the current time. As mentioned above, startTime can be used to calculate the total length of a monitoring interval. If the setStartTimeNow method is called after data points have already been collected, then the calculated total length of the monitoring interval and proportion of time spent in store operations will not be accurate. The variable startTime is initialized to the time the StorageStats constructor is invoked, and thus the setStartTimeNow method does not need to be invoked unless there is a delay before the StorageStats object is used.

The setEndTimeNow method is used to set the variable endTime to the current time. The variable endTime is used to calculate the total length of the monitoring interval. If data collection continues after endTime, then the calculated total length of the monitoring interval and the proportion of time spent in store operations will not be accurate.

The summaryStats method returns a string describing summary statistics. If the variable numRequests is 0, summaryStats returns a string indicating that there are no storage requests for storeType. Otherwise, summaryStats return various information such as the total number of storage requests, the total storage request time, the average time per storage request, the start time, the end time, the length of the monitoring interval and the proportion of time spent on storage operations. The detailedStats method returns a string describing statistics by request type. The allStats method returns the information from summaryStats and detailedStats.

The StorageStats class maintains statistics for a particular storage system. An additional class, RequestStats, maintains statistics for transactions or storage requests of a particular type. FIGS. 6A-6E show example code used to implement the RequestStats class. FIG. 6A shows portion 600-1 of the sample code, FIG. 6B shows portion 600-2 of the sample code, FIG. 6C shows portion 600-3 of the sample code, FIG. 6D shows portion 600-4 of the sample code and FIG. 6E shows portion 600-5 of the sample code. The portions 600-1, 600-2, 600-3, 600-4 and 600-5 are collectively referred to herein as request statistics code 600. The request statistics code 600 is written in the Java programming language, similar to the common interface code 300, monitoring code 400 and storage statistics code 500. The common interface 140, however, may implement request statistics functionality via code written in various other types of programming languages in other embodiments.

Similar to the storage statistics code 500, the request statistics code 600 defines or utilizes a number of variables, including requestTimes, rear, numRequests, totalRequestTime, and requestType. The requestTimes variable is used to maintain request times for a last n storage requests. The rear variable is an index in requestTimes indicating the rear of a queue. numRequests indicates a total number of storage requests, and totalRequestTime indicates the total time spent processing storage requests.

Request statistics code 600 defines a number of methods. The getNumRequests method is used to return a total number of requests, e.g., from the variable numRequests. The getTotalRequestTime method is used to return a total time taken by storage requests, e.g., from the variable totalRequestTime. The getRequestType method is uses to return a string indicating a type of storage request corresponding to statistics, e.g., the variable requestType. The method getRecentRequestTimes is used to return an array of the most recent storage request overheads ordered from least to most recent, e.g., the variable requestTimes.

The summaryStats method is used to return a string value describing summary statistics for storage requests of a particular type. If the numRequests variable is 0, summaryStats returns a string indicating that there are no storage requests of a particular type. Otherwise, summaryStats returns information such as the total number of storage requests of the particular type, the total storage request time for storage requests of the particular type and the average time per storage request of the particular type. The recentOverheads method is used to return a string describing recent storage request overheads. Again, if the numRequests variable is 0 there are no statistics to return and recentOverheads returns a string value indicating that there are no storage requests of a particular type. Otherwise, recentOverheads returns information such as the time for recent storage requests of the particular type ordered from earliest to latest, the total number of recent storage requests of the particular type, the total time for recent storage requests of the particular type and the average time for recent storage requests of the particular type. The method allStats returns the information from summaryStats and recentOverheads for storage requests of the particular type.

The performance monitor 142, in conjunction with common interface 140, can provide summary statistics for multiple storage requests and/or storage systems as well as detailed statistics for individual storage requests and/or storage systems. Summary statistics, as discussed above, may include information such as the total number of storage requests over a given time period, or the total time taken by storage requests over a given time period. Statistics may be maintained for all storage requests generally as well as for all storage requests of a particular type. Detailed statistics may be provided which include, by way of example, the overhead for individual storage requests. The requestTimes variable of the RequestStats class in request statistics code 600, for example, stores overheads for recent storage requests of a given type. This is a useful feature, as recent performance statistics may be more informative or useful than performance statistics from farther in the past. Storing all past overheads for individual storage requests can have high overhead itself, and thus some embodiments provide the ability to limit the number of past overheads which are stored.

In the Java implementations of storage statistics code 500 and request statistics code 600, the various statistics are stored in main memory. In other embodiments, however, the statistics can be stored persistently using one or more of storage systems 106 or another data store or storage system designated by the universal storage manager 104. The statistics may be stored in file systems, SQL or other relational databases, NoSQL databases, caches, etc. Some embodiments provide serialization capabilities so as to serialize data for storage systems that require it.

There are multiple options for storing monitoring data persistently, including: (1) storing monitoring data persistently immediately, or substantially in real-time as the data is obtained or created; (2) storing monitoring data persistently after a time since the last time data was stored persistently exceeds a designated threshold; (3) storing monitoring data persistently after a number of monitored storage requests since the last time data was stored persistently exceeds a designated threshold; (4) storing monitoring data persistently when a special event occurs such as encountering a data value which is anomalous, e.g., a store request time which is too high and/or too low relative to specified thresholds; and (5) storing monitoring data persistently based on instructions from a user, application 102 and/or a client device running application 102, e.g., the decision to store monitoring data persistently may be based on application-specific characteristics. It is to be appreciated that the above options as to when to persistently store monitoring data are presented by way of example only. Some embodiments may use one or more of the above options in addition to various other options for storing monitoring data persistently.

In some embodiments, the KeyValueMonitored class is implemented via a MonitoredKeyValue class such that the same monitoring code can be used for each storage system implementing the KeyValue interface. This advantageously avoids the need for implementing different monitoring code for each storage system implementation. FIG. 7 shows example code 700 for implementing the KeyValueMonitored class via the MonitoredKeyValue class. The sample code 700 is also referred to as uniform monitoring code 700. The uniform monitoring code 700 includes a constructor that takes as input a parameter kvStore indicating an object corresponding to a store to be monitored and a parameter historyLength indicating the number of most recent data points to keep for each storage request type. The kvStore can be an object representing any of the storage systems which implement the KeyValue interface, allowing the monitoring code to be reused as illustrated by the get method shown in uniform monitoring code 700. The same get method can be applied to any storage system, with the variable store corresponding to the storage system implementing the KeyValue interface.

While FIG. 7 shows sample code which may be used for monitoring various types of storage systems, other embodiments may apply or utilize individual customized monitoring methods or code for different storage systems.

Performance monitor 142 may also be used to evaluate storage systems 106 with respect to performance and availability. One performance metric which may be utilized is the average time to satisfy a storage request, although other types of performance metrics may be used including but not limited to number or frequency of dropped, failed or otherwise unsuccessful storage requests.

If a storage operation is taking too long, this is a problem that should be brought to the attention of a user, application 102, and/or a client device running application 102. Various techniques may be used to determine if a storage operation is taking too long. For example, some embodiments may utilize average latency for all storage requests or for recent storage requests. In this context, latency refers to the length of time to satisfy a storage request. If the average latency of requests exceeds a threshold, this can be flagged as a problem. Alternatively or additionally, if the average latency of recent requests exceeds a threshold, this can be flagged as a problem. Different thresholds may be used for all requests and for recent requests. Recent requests may be a designated number of the most recent requests, e.g., the last 10, 100, 1000, etc. requests, or possibly requests in a given time frame, e.g., the last hour, day, week, month, etc.

As another example, a high latency threshold $t_1$ may be used to determine whether storage operations are taking too long. If any latency measurement exceeds $t_1$, this can be flagged as a problem. Alternatively or additionally, latencies may be measured over some time frame. If the frequency of latencies exceeding high latency threshold $t_2$ exceeds a threshold, this can be flagged as a problem. In some embodiments, $t_1$ and $t_2$ may be equal to one another.

Embodiments may use any one of or combination of the above techniques for determining if a storage operation is taking too long. In addition, different thresholds may be used for different types of storage requests. As an example, the value of the high latency threshold $t_1$ may be different for read requests relative to write requests. As another example, the value of the high latency threshold $t_1$ may vary for different storage requests of a particular type, such as using different high latency thresholds for read or write requests based on the amount of data to be read or written.

Performance monitor 142 may also be used to evaluate storage systems 106 with respect to availability. It is desired that a storage system is available as much as possible. In order to determine if a storage system is available, performance monitor 142 can set a threshold response time $t_{r1}$. If a storage system fails to respond to a storage request within time $t_{r1}$, the storage system is considered to be unavailable. Another option is to measure response times over a period of time. A storage system may be considered unavailable if the frequency with which the storage system fails to respond to a storage request within a threshold response time $t_{r2}$ exceeds a threshold. In some embodiments, $t_{r1}$ is equal to $t_{r2}$. Similar to the high latency thresholds $t_1$ and $t_2$, the threshold response times $t_{r1}$ and $t_{r2}$ may vary for different types of storage requests or for different storage requests of a particular type.

Users, application 102, and/or a client device running application 102 may utilize the performance monitor 142 and/or common interface 140 to obtain performance and availability data. The performance of a storage system may be highly dependent on application workload. Thus, the performance monitor 142 may monitor specific application workloads or workload types to determine performance and/or availability on a specific workload. For example, if a particular workload involves a large number of read requests but comparatively few write requests, performance and availability information specific to read requests or other read request heavy workloads may be particularly useful.

If performance on a particular workload is poor, as measured by a designated performance threshold, the performance monitor 142 may send an alert to the application 102 owning or running that workload. Alerts may also be provided to the application 102 regardless of performance level periodically, on request by the application 102, in response to estimated performance changing more than a designated threshold, etc. The application 102 may choose to dynamically switch the workload to another one of storage systems 106 based on the estimated performance of the workload.

In some embodiments, universal storage manager 104 can run a same application workload from application 102 on multiple ones of the storage systems 106 to compare performance in order to determine which storage system to use. As an example, a workload may be run on multiple ones of the storage systems 106 for a designated period of time, then discontinued on all but the highest performing one of the storage systems 106 (or the top two, three, four, etc. ones of the storage systems 106).

Running the same workload on multiple ones of the storage systems 106 concurrently may, in some cases, be prohibitively expensive. A less costly alternative is to use one storage system $s_1$ as the primary storage system for an application workload. A small fraction of storage requests for that workload may be sent to one or more other storage systems. The small fraction may be a particular proportion or percentage of requests, such as 1%, 5%, 10%, etc. as desired for a particular implementation The small fraction may alternatively be a particular number of requests, such as 1 request, 5 requests, 10 requests, etc. as desired for a particular implementation. The small fraction may further include a portion or number of storage requests in each of one or more of a plurality of classes of storage requests, such as 5 read requests or 5 write requests, 5% of read requests or 5% of write requests, etc. as desired for a particular implementation. The particular examples of percentages and numbers of storage requests are provided by way of example only. Embodiments are not limited solely to using these specific numbers and/or percentages as the small fraction of storage requests.

If performance monitor 142 determines that the application workload would perform better on another storage system $s_2$, the application 102 owning or running that workload may be notified. The application 102 can then choose whether to make $s_2$ the primary storage system for the workload. Alternatively, the performance monitor 142 may switch the workload to $s_2$ automatically on determining that the estimated performance would increase by more than a designated threshold without waiting for explicit instructions from the application.

Universal storage manager 104 can also store data for a workload in multiple ones of the storage systems 106. That way, if one of the storage systems 106 is not responsive or is not reliable, data can be obtained from another storage system. In order to store data in multiple storage systems, concurrently executing threads or processes can store data in first and at least second storage systems. Thus, the main computation can continue executing while at least one backup is stored in the second storage system. Alternatively, a backup copy can be stored in the second storage system by a main thread or process. If the same data object is stored in multiple ones of the storage systems 106, it is possible that there may be different values for the same data object in different storage systems. One way to resolve this situation is to see which value is stored in the most storage systems and use that as the correct value if such a value exists. Another approach is to indicate that multiple values of the data object exist and provide all existing values as being potentially correct.

Figure 8:
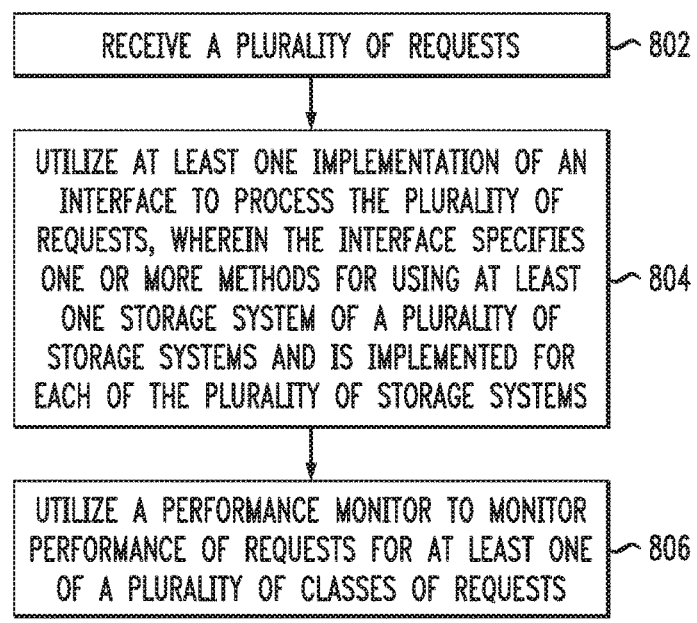
FIG. 8 depicts a process for monitoring storage systems, according to an embodiment of the present invention.

FIG. 8 shows a process 800 for monitoring storage systems. The process 800 may be performed utilizing the system 100. The process 800 begins with step 802, receiving a plurality of requests. The requests may be storage requests that are received from at least one application, e.g., application 102, and that are directed to a plurality of storage systems, e.g., storage systems 106.

In step 804, at least one implementation of an interface is utilized to process the plurality of requests received in step 802. The interface, e.g., common interface 140, specifies one or more methods for using at least one storage system and is implemented for each of the plurality of storage systems.

The process continues with step 806, utilizing a performance monitor, e.g., performance monitor 142, to monitor performance of requests for at least one of a plurality of classes of requests. Requests that are directed to one of the plurality of storage systems may be assigned to different classes based on the request type. As an example, read requests and write requests may be assigned to different classes.

In some embodiments, the performance monitor is used to obtain performance information for at least one of the plurality of storage systems. The performance information may be used by the performance monitor to estimate performance of one or more storage systems for a given workload. The estimated performance may be used to select a given storage system or systems to use for a given workload. A process may be defined for monitoring performance of storage requests, where the process has access to a variable whose type is the interface that specifies the set of methods for using the storage systems. The process may be used with the variable in code implementing the performance monitor. FIGS. 3-7 discussed above show examples implementations of such code.

Performance indicators for storage systems may be communicated to application programs, such as application 102. Application 102 may be implemented or run on a client device. The universal storage manager 104, as discussed above, may be implemented at least partially internal to the client device running application 102 and/or at least partially external to the client device running application 102. The universal storage manager 104 may also be implemented at least partially within one or more of the storage systems 106. In some embodiments, the application 102, universal storage manager 104 and one or more of storage systems 106 may be implemented or run on a same client device, computer or server. The application 102, universal storage manager 104 and one or more of storage systems 106 may also be run on a group of computing or processing devices, such as a cloud computing platform or other distributed infrastructure, including a group of computing or processing devices connected over one or more networks. In some embodiments, as will be detailed below, the functionality of the universal storage manager 104 may be provided in a cloud computing platform solution. In such cases, performance indicators may be provided to the tenants or other users of the cloud computing platform.

The performance indicators may trigger functionality of an application program, such as via an API, to invoke processes for determining whether to migrate or keep the workload on a particular storage system or systems based on the performance indicators. In some embodiments, the performance indicators are only sent to an application program when a storage system or systems running a particular workload are performing poorly or exhibiting a performance level below a designated performance threshold. In other embodiments, performance indicators may be sent periodically or in response to an explicit request from the application program in addition to or in place of providing performance indicators responsive to determining that a storage system or systems are exhibiting poor performance. In some cases, performance indicators may also be sent if a storage system or systems are performing well as measured by some designated performance threshold. In such cases, the performance indicator may trigger APIs or other functionality of an application program so as to notify the program of high performing storage systems to possibly migrate additional workloads to such systems.

Workloads may be switched between storage systems based on performance indicators, either dynamically by the universal storage manager 104 or via requests from an application program. As an example, an application program may define its own thresholds for migrating workloads between storage systems. Thus, a given performance indicator may cause a first application program to migrate a given workload while that same performance indicator would not cause a second application program to migrate the given workload. The decision to migrate or dynamically switch workloads may also be based on a variety of factors including but not limited to, any relationship or dependencies between concurrently running workloads, time remaining to complete workloads, etc.

In some embodiments, a workload utilizes multiple storage systems. In such cases, there may be a first storage system which is a primary storage system for a workload. A first number or amount of storage requests may be sent to the first storage system, while a second smaller number or amount of storage requests are sent to a second storage system for a particular workload. These requests may be used to obtain performance information for the first and second storage systems. The designation of the primary storage system may be modified based on the performance information. Concurrently executing threads may be used for some workloads to facilitate the use of or storage of data on multiple storage systems.

The performance monitor may use the same computer code to monitor the performance of each of the plurality of storage systems, as discussed above in conjunction with FIG. 7. The plurality of storage systems may include storage systems of multiple different types, including but not limited to SQL databases, NoSQL databases, caches, file systems, etc.

The performance monitor, using the interface, may collect summary performance statistics for the plurality of storage systems over a first period of time as well as request overheads for the plurality of storage systems for most recent storage requests to the plurality of storage systems. The summary statistics may be further collected or organized based on classes of storage requests for each storage system. Recency may be determined as a threshold number of storage requests or a threshold amount of time.

Monitoring data may be stored using the performance monitor persistently. A number of options may be used to store the monitoring data persistently, including using one or more of storing monitoring data persistently immediately, storing monitoring data persistently after a time elapsed since a last time monitoring data was persistently stored exceeds a first threshold, storing monitoring data persistently after a number of monitored storage requests since a last time monitoring data was persistently stored exceeds a second threshold, storing monitoring data persistently responsive to occurrence of a designated event, the designated event comprising encountering an anomalous data value, and storing monitoring data persistently in response to instructions from an application program implemented on a client device coupled to said at least one processing device over at least one network.

In some embodiments, the performance monitor is used to determine latency associated with storage requests to a given one of the plurality of storage systems. The latency may be determined using one or more of average latency for previous storage requests to the given storage system, average latency for recent ones of the previous storage requests to the given storage system, a number of violations of a high latency threshold for previous storage requests to the given storage system, and a frequency of violations of the high latency threshold for previous storage requests to the given storage system. Latency may also be determined for two or more storage systems collectively.

The performance monitor may also be used in some embodiments to determine availability associated with a given one of the plurality of storage systems. Availability may be determined using one or more of a number of violations of a high latency threshold for previous storage requests to the given storage system and a frequency of violations of the high latency threshold for previous storage requests to the given storage system. Availability may also be determined for two or more storage systems collectively.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM). a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
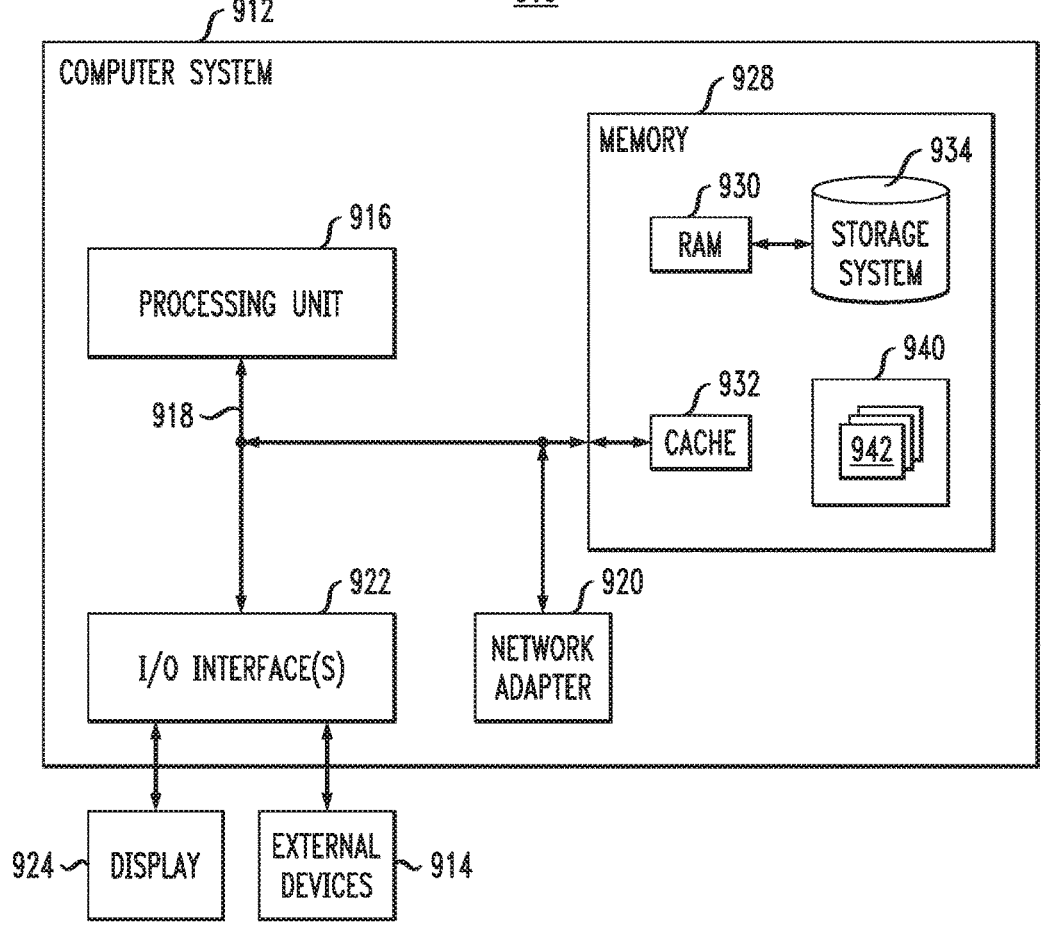
FIG. 9 depicts a computer system in accordance with which one or more components/steps of techniques of the invention may be implemented, according to an embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via I/O interfaces 922. Still yet, computer system/server 912 can communicate with one or more networks such as a LAN, a general WAN, and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
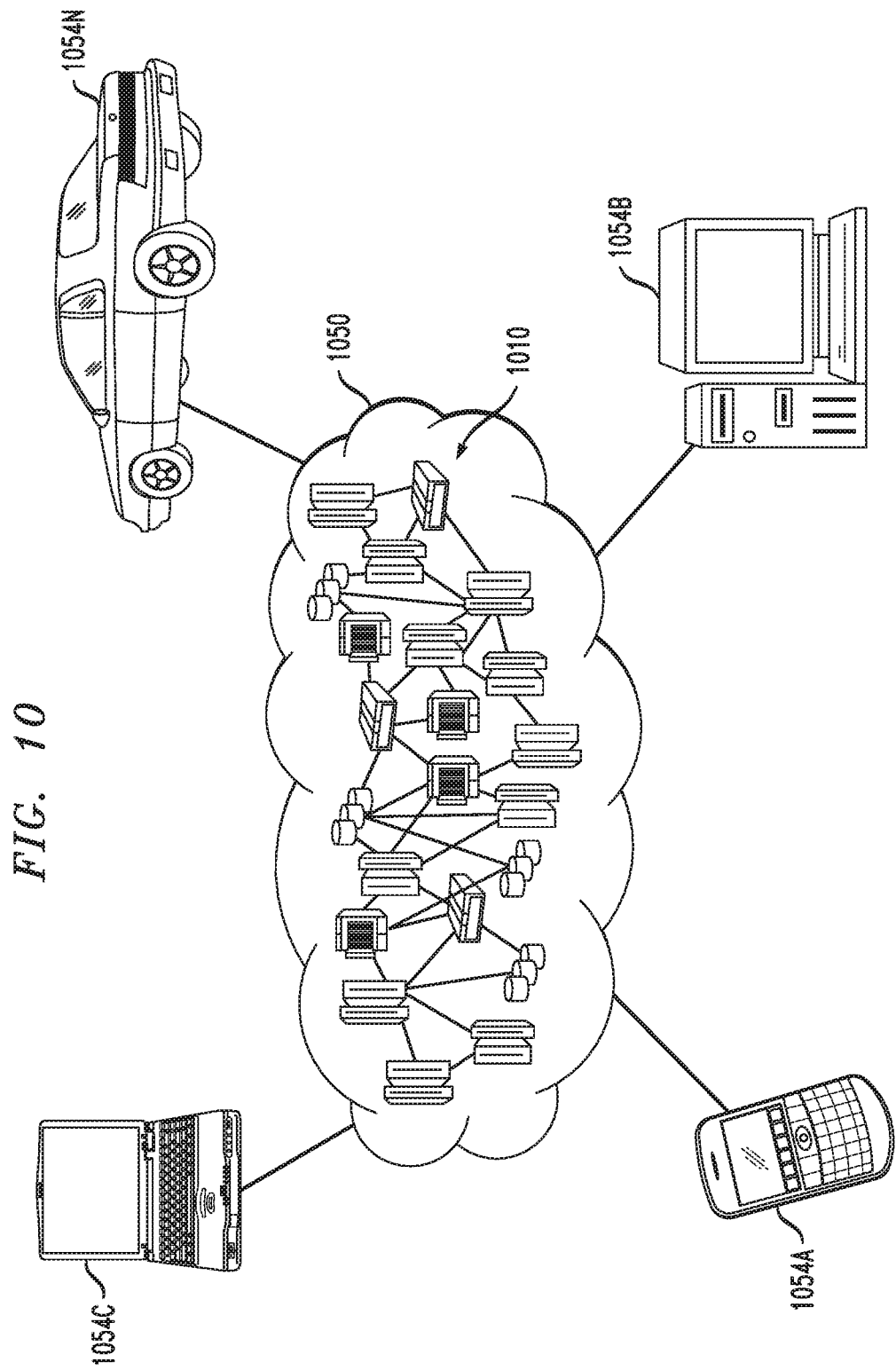
FIG. 10 depicts a cloud computing environment, according to an embodiment of the present invention.

Referring now to FIG. 10, illustrative cloud computing environment 1050 is depicted.

As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
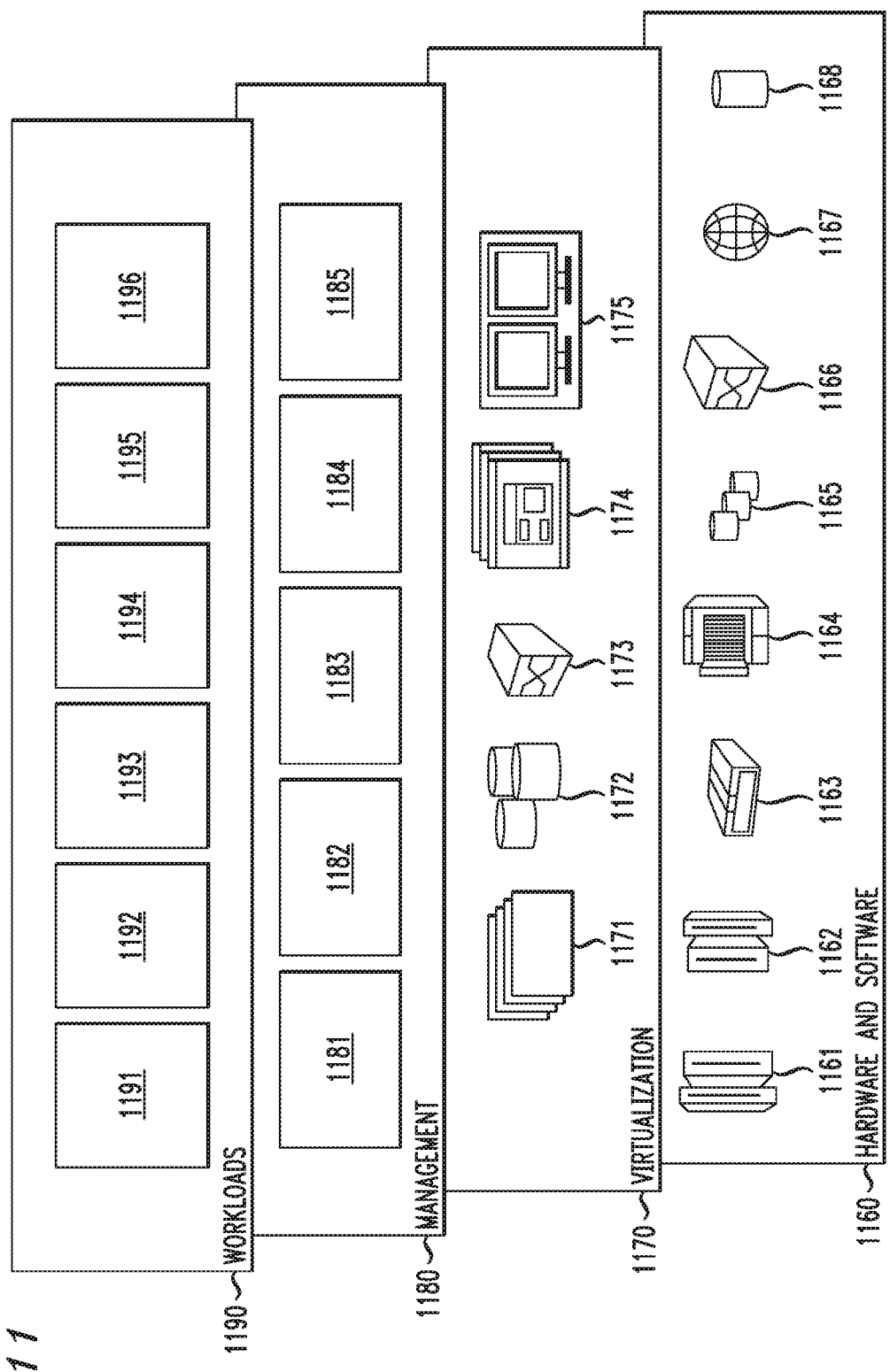
FIG. 11 depicts abstraction model layers, according to an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and storage system monitoring 1196, which may perform various functions described above with respect to universal storage manager 104.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for monitoring a plurality of storage systems comprising:
    an interface for accessing a plurality of different types of storage systems, wherein the interface comprises computer code specifying a common set of methods for performing storage operations on the plurality of different types of storage systems, the computer code being written in a programming language that enables a plurality of implementations of the interface within a same computer program;
    the computer program comprising an implementation of the interface for each of two or more of the plurality of different types of storage systems of different types, wherein the implementations of the interface are configured to utilize the common set of methods for performing storage operations to process a plurality of requests for a given workload received from at least one application; and
    a performance monitor configured to monitor performance of the given workload and to select one or more of the plurality of different types of storage systems for processing at least a subset of the plurality of requests for the given workload;
    wherein the performance monitor utilizes a same set of computer code for monitoring each of the plurality of storage systems;
    wherein the performance monitor for a given one of the plurality of storage systems is implemented using the same set of computer code as an extension of a given implementation of the interface for the given storage system;
    wherein the system is implemented using at least one processing device comprising a processor coupled to a memory.

2. The system of claim 1, wherein selecting one or more of the plurality of storage systems for processing at least a subset of the plurality of requests for the given workload comprises dynamically switching the given workload between a first one of the plurality of storage systems and at least a second one of the plurality of storage systems.

3. The system of claim 1, wherein the same set of computer code comprises at least one method to monitor performance of at least one type of storage requests, the method to monitor performance utilizing a variable whose type is the interface specifying the common set of methods for performing storage operations on the plurality of storage systems.

4. The system of claim 1, wherein the same set of computer code providing the performance monitor for the given storage system comprises a constructor that takes as input a parameter indicating the given storage system.

5. The system of claim 4, wherein the constructor further takes as input a parameter indicating a number of most recent data points to maintain for each of one or more storage request types.

6. The system of claim 1, wherein the performance monitor is further configured to:
 collect summary performance statistics for the plurality of storage systems over a time period; and
 collect request overheads for most recent requests for the plurality of storage systems.

7. The system of claim 1, wherein the performance monitor is configured to provide multiple techniques for storing monitoring data persistently, the multiple techniques comprising:
 storing monitoring data persistently immediately;
 storing monitoring data persistently after a time elapsed since a last time monitoring data was persistently stored exceeds a first threshold;
 storing monitoring data persistently after a number of monitored requests since a last time monitoring data was persistently stored exceeds a second threshold;
 storing monitoring data persistently responsive to occurrence of a designated event, the designated event comprising encountering an anomalous data value; and
 storing monitoring data persistently in response to instructions from the at least one application.

8. The system of claim 1, wherein the performance monitor is configured to determine if a latency to satisfy requests satisfies a reporting threshold using multiple criteria, the multiple criteria comprising:
 average latency for requests;
 average latency for recent requests, wherein recent requests comprises requests within a designated time period before a current time;
 a one-time violation of a first high latency threshold; and
 a frequency of violations of a second high latency threshold.

9. The system of claim 1, wherein the performance monitor is configured to monitor at least one of the plurality of storage systems for availability.

10. The system of claim 9, wherein the performance monitor is configured to determine if a storage system is unavailable using multiple criteria, the multiple criteria comprising:
 a one-time violation of a first high latency threshold; and
 a frequency of violations of a second high latency threshold.

11. The system of claim 1, wherein the performance monitor is configured to indicate to the at least one application when one or more of the plurality of storage systems is performing below a predetermined performance level.

12. The system of claim 1, wherein the performance monitor is configured to dynamically start using a second one of the plurality of storage systems in response to a first one of the plurality of storage systems exhibiting performance below a predetermined performance level.

13. A method comprising:
 receiving a plurality of requests for a given workload from at least one application;
 utilizing implementations of an interface for each of two or more of a plurality of different types of storage systems to process the plurality of requests, wherein the interface comprises computer code specifying a common set of methods for performing storage operations on the plurality of different types of storage systems, the computer code being written in a programming language that enables a plurality of implementations of the interface within a computer program, and each implementation of the interface comprises computer code written in the programming language which implements at least one of the common set of methods specified by the interface; and
 utilizing a performance monitor to monitor performance of the given workload and to select one or more of the plurality of different types of storage systems for processing at least a subset of the plurality of requests for the given workload;
 wherein the performance monitor utilizes a same set of computer code for monitoring each of the plurality of storage systems;
 wherein the performance monitor for a given one of the plurality of storage systems is implemented using the same set of computer code as an extension of a given implementation of the interface for the given storage system;
 wherein the method is performed by at least one processing device comprising a processor coupled to a memory.

14. The method of claim 13, wherein the same set of computer code providing the performance monitor for the given storage system comprises a constructor that takes as input a parameter indicating the given storage system.

15. The method of claim 14, wherein the constructor further takes as input a parameter indicating a number of most recent data points to maintain for each of one or more storage request types.

16. A computer program product comprising a computer readable storage medium for storing computer readable program code which, when executed, causes a computer to:
 receive a plurality of requests for a given workload from at least one application;
 utilize implementations of an interface for each of two or more of a plurality of different types of storage systems to process the plurality of requests, wherein the interface comprises computer code specifying a common set of methods for performing storage operations on the plurality of different types of storage systems, the computer code being written in a programming language that enables a plurality of implementations of the interface within a computer program, and each implementation of the interface comprises computer code written in the programming language which implements at least one of the common set of methods specified by the interface; and
 utilize a performance monitor to monitor performance of the given workload and to select one or more of the plurality of different types of storage systems for processing at least a subset of the plurality of requests for the given workload;
 wherein the performance monitor utilizes a same set of computer code for monitoring each of the plurality of storage systems;
 wherein the performance monitor for a given one of the plurality of storage systems is implemented using the same set of computer code as an extension of a given implementation of the interface for the given storage system.

17. The computer program product of claim 16, wherein selecting one or more of the plurality of storage systems for processing at least a subset of the plurality of requests for the given workload comprises dynamically switching the given workload between a first one of the plurality of storage systems and at least a second one of the plurality of storage systems.

18. The computer program product of claim 16, wherein the same set of computer code comprises at least one method to monitor performance of at least one type of storage requests, the method to monitor performance utilizing a variable whose type is the interface specifying the common set of methods for performing storage operations on the plurality of storage systems.

19. The computer program product of claim 16, wherein the same set of computer code providing the performance monitor for the given storage system comprises a constructor that takes as input a parameter indicating the given storage system.

20. The computer program product of claim 19, wherein the constructor further takes as input a parameter indicating a number of most recent data points to maintain for each of one or more storage request types.

* * * * *